(12) United States Patent
Takatsu

(10) Patent No.: US 6,615,968 B2
(45) Date of Patent: Sep. 9, 2003

(54) BALL BEARING ASSEMBLY ELECTROMAGNETIC CLUTCH HAVING BALL BEARING ASSEMBLY AND GAS COMPRESSOR UTILIZING ELECTROMAGNETIC CLUTCH

(75) Inventor: Hidehisa Takatsu, Chiba (JP)

(73) Assignee: Seiko Instruments Inc. (JP)

( * ) Notice: Subject to any disclaimer, the term of this patent is extended or adjusted under 35 U.S.C. 154(b) by 0 days.

(21) Appl. No.: 09/916,526

(22) Filed: Jul. 27, 2001

(65) Prior Publication Data

US 2002/0028144 A1 Mar. 7, 2002

(30) Foreign Application Priority Data

Jul. 28, 2000 (JP) .......................... 2000-228965
Jun. 29, 2001 (JP) .......................... 2001-199594

(51) Int. Cl.[7] ............................................. F16D 27/112
(52) U.S. Cl. ............................. 192/84.961; 192/110 B; 384/490
(58) Field of Search ........................ 192/84.961, 110 B; 384/490, 543

(56) References Cited

U.S. PATENT DOCUMENTS

| 1,394,110 A | | 10/1921 | Nelson | |
| 2,499,640 A | * | 3/1950 | Gamet | 384/467 |
| 3,292,980 A | | 12/1966 | Gustafsson et al. | 308/193 |
| 4,425,520 A | | 1/1984 | Hiraga | 310/92 |
| 4,468,178 A | * | 8/1984 | Hiraga et al. | 417/440 |
| 4,645,435 A | | 2/1987 | Sugimoto | 418/55 |
| 5,356,277 A | * | 10/1994 | Yamaguchi et al. | 418/179 |
| RE35,672 E | * | 11/1997 | Taguchi | 414/222.2 |
| 6,102,822 A | * | 8/2000 | Nakazeki | 384/523 |
| 6,244,408 B1 | * | 6/2001 | Tobayama et al. | 192/84.961 |

FOREIGN PATENT DOCUMENTS

| DE | 199062191 | | 9/2000 | |
| JP | 58-174729 A | * | 10/1983 | 192/84.961 |

OTHER PUBLICATIONS

Patent Abstracts of Japan, vol. 2000, No. 09, Oct. 13, 2000, publication No. 2000170753, publication date Jun. 20, 2000.

* cited by examiner

Primary Examiner—Richard M. Lorence
(74) Attorney, Agent, or Firm—Adams & Wilks

(57) ABSTRACT

An electromagnetic clutch having an electromagnet, a rotational member mounted to undergo rotation, an armature selectively coupled to the rotational member for rotation therewith when the electromagnet is energized, and a ball bearing rotatably supporting the rotational member. The ball bearing has an inner race, an outer race, and a plurality of balls arranged in a plurality of rows each containing an odd number of the balls. The balls of the ball bearing are disposed between the inner race and the outer race so that each of the balls contacts the inner race at at least one point and contacts the outer race at at least one point.

18 Claims, 10 Drawing Sheets

DIRECTION OF VIBRATION MEASUREMENT

DIRECTION OF VIBRATION MEASUREMENT

INVENTION PRODUCT (THE NUMBER OF BALLS: 13)

CONVENTIONAL PRODUCT (THE NUMBER OF BALLS: 14)

INVENTION PRODUCT (THE NUMBER OF BALLS: 13)

CONVENTIONAL PRODUCT (THE NUMBER OF BALLS: 14)

DIRECTION OF VIBRATION

Prior Art

BALL BEARING ASSEMBLY
ELECTROMAGNETIC CLUTCH HAVING
BALL BEARING ASSEMBLY AND GAS
COMPRESSOR UTILIZING
ELECTROMAGNETIC CLUTCH

BACKGROUND OF THE INVENTION

1. Field of the Invention

The present invention relates to a ball bearing assembly structure, an electromagnetic clutch having the ball bearing assembly structure, and a gas compressor equipped with the electromagnetic clutch.

2. Description of the Related Art

In a vane-type gas compressor used for a car air conditioner or the like, a rotary power is transmitted from an engine-crankshaft pulley to a rotor shaft 40 through a belt 60 and electromagnetic clutch 50 as shown in FIG. 1.

The electromagnetic clutch 50 has a ring-shape electromagnet 51, a prime-mover pulley 5 for passing the magnetic flux of the electromagnet 51, a plurality of rows of ball bearing 530 (see FIG. 10) for rotatably and coaxially holding the prime-mover pulley 52 to the electromagnet 51, and a follower armature plate 54 to be attracted or adsorbed to an end surface 52a of the prime-mover pulley 52 by the magnetic flux.

During engine rotation, the prime-mover pulley 52 and the ball bearing 530 holding the same are rotatively driven at all times by a belt 60.

When operating the gas compressor 1, the electromagnet 51 of the electromagnetic clutch 50 is energized to attract or adsorb the follower armature plate 54 to an end surface 52a of the prime-mover pulley 52 and join the prime-mover pulley 52 and the rotor shaft 40, thereby rotating the rotor shaft 40.

The ball bearing 530 of the electromagnetic clutch 50 conventionally has used one having an even number of balls 530a per row, e.g. fourteen as shown in FIG. 10. Generally, the ball bearing causes vibration and noise due to rotation. In the case of the ball bearing 530 rotating while undergoing a radial load due to a tension of the belt 60, vibration and noise considerably occur. Particularly when other vibration and noise levels are lowered during engine idling, the vibration and noise of the ball bearing 530 transmitted to the vehicular compartment is not negligible.

The inventor has conducted various experiments and discovered that the one factor of high vibration and noise level is an even number of balls of the ball bearing. In the ball bearing 530 having an even number of balls 530a per one row, the balls 530a are in a facing relation to have linear-symmetry arrangement between the inner race 530b and the outer race 530c. The deformation and vibration at a regular particular frequency is caused in the inner and outer races. It is to be considered that the vibration as a source also increases noise.

SUMMARY OF THE INVENTION

The present invention overcomes the foregoing problem in the conventional art and provides an electromagnetic clutch low in vibration and noise resulting from a ball bearing assembly of the present invention and a gas compressor with the electromagnetic clutch.

In order to solve the foregoing problems in the conventional art, the present invention provides an electromagnetic clutch having a ball bearing assembly having an odd number of balls per row. By providing the odd number of balls, the arrangement of balls will not be in a facing relation. The deformation in the inner and outer races during rotation of the ball bearing while undergoing a radial load is made irregular and complicated, eliminating the deformation and vibration at a regular predetermined frequency and lowering the level of vibration and noise.

DETAILED DESCRIPTION OF THE PREFERRED EMBODIMENT

Figure 1:
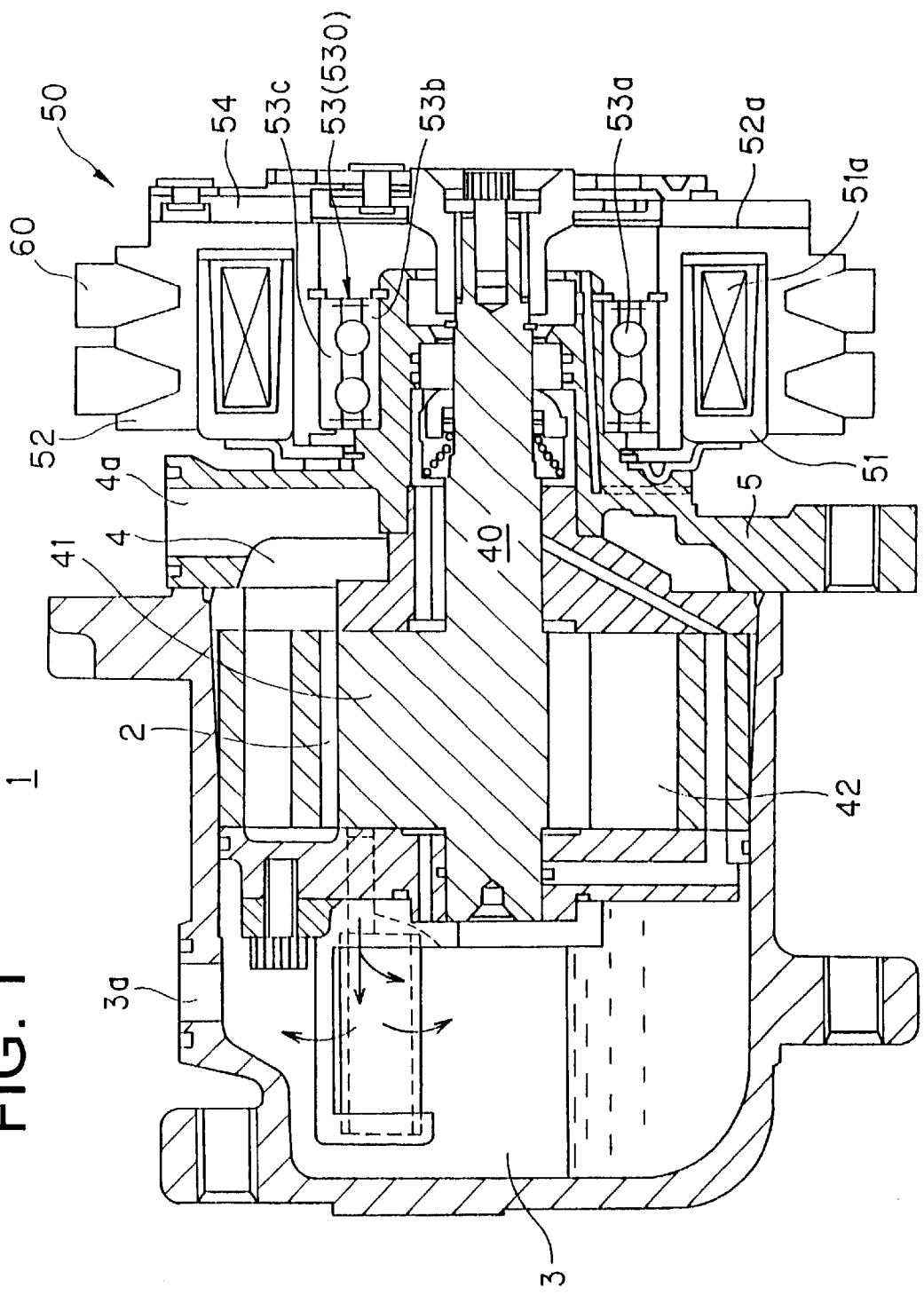
FIG. 1 is a longitudinal sectional view showing an embodiment of this invention.
Figure 2:
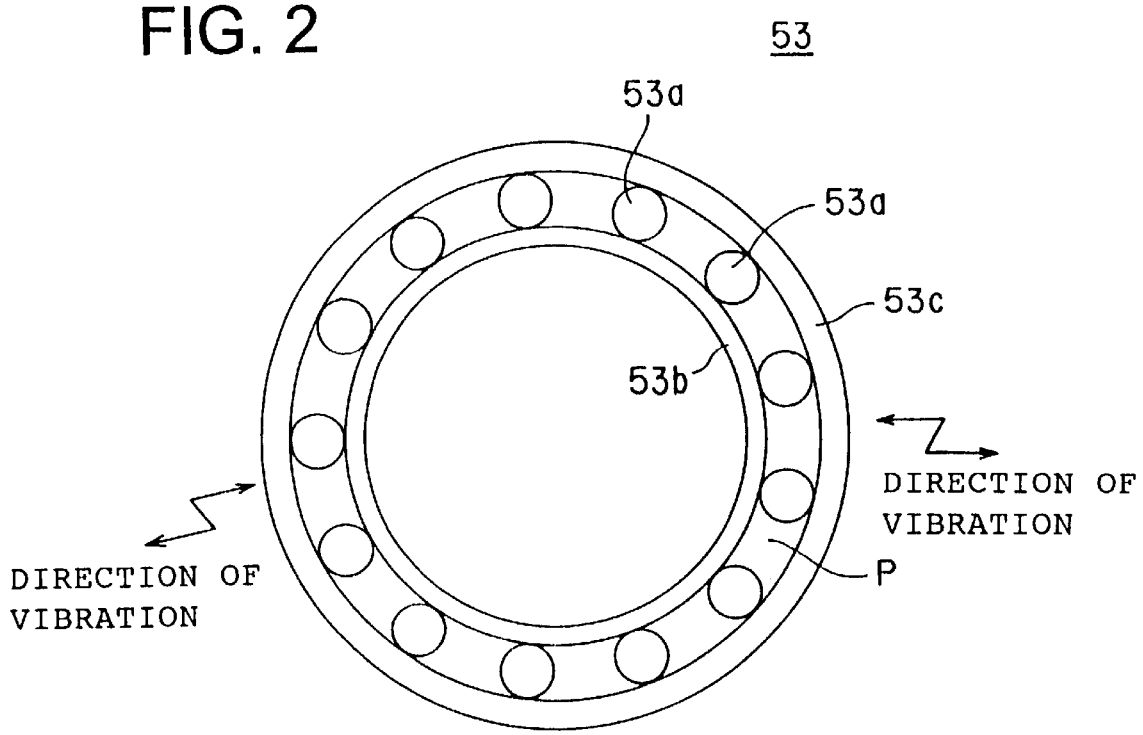
FIG. 2 is a front view showing a ball bearing of the gas compressor of FIG. 1.

An embodiment of this invention will be explained below with reference to FIG. 1 to FIG. 9. FIG. 1 is a lengthwise sectional view showing an embodiment of this invention, and FIG. 2 is a front view showing a ball bearing of a gas compressor of FIG. 1.

In FIG. 1, the gas compressor 1 is provided with an electromagnetic clutch 50. The electromagnetic clutch 50 is transmitted with a drive force for rotation from an engine crankshaft through a belt 60 wound over a prime-mover pulley 52 on a prime-mover side thereof.

When the electromagnetic clutch 50 is excited, a follower armature plate 54 on a follower side coupled to the rotor shaft 40 is attracted or adsorbed to and coupled or integrated with an end surface 52a of the prime-mover pulley 52, to transmit a rotary power to the rotor shaft 40. Thus the prime-mover pulley 52 functions as a rotational member which rotates, in a cylinder chamber 2, the rotor 41 integrated with the rotor shaft 40 and the vanes 42 sliding in radial grooves of the rotor 41 to compress the gas within the cylinder 2.

Incidentally, the compressed gas is discharged to a discharge chamber 3 where it is delivered through a discharge port 3a to a piping system such as a car air conditioner, not shown, and returned through a suction port 4a to a suction chamber 4, again being taken into the cylinder chamber 2.

In the electromagnetic clutch 50, provided is an electromagnet 51 in a ring form fixed on a front cover (frame) 5 of the gas compressor 1. When the coil 51a of the electromagnet 51 is energized, the electromagnetic clutch 50 is excited. The magnetic flux generated by the electromagnet 51 passes through an inside of the prime-mover pulley 52, to attract the follower armature plate 54 onto the end surface 52a of the prime-mover pulley 52.

The prime-mover pulley 52 is rotatably held coaxially to the electromagnet 51 on the frame 5 of the gas compressor 1, through a ball bearing 53 having a plurality of rows of balls 53a. More specifically, the inner race 53b of the ball bearing 53 is attached on the frame 5 of the gas compressor 1, and the outer race 53c holds the prime-mover pulley 52. That is, an outer-race-rotating assembling structure is provided by assembling the inner race 53b on the side of non-rotatable stator and the outer race 53c on the side of a rotatable rotor. This ball bearing 53 is acted upon with, in addition to the load due to the weight of the prime-mover pulley 52, rotating vibration and the like, a further greater load in a radial direction due to tension, vibration and the like of the belt 60.

The foregoing structure and operation is similar to the gas compressor using an electromagnetic clutch. Next, the featured parts of this invention are explained.

The ball bearing 53 has, as shown in FIG. 2, balls 53a in an odd number of balls per row, thirteen in this embodiment, arranged nearly equally spaced on a pitch circle p through a retainer (not shown) between the inner race 53b and the outer race 53c.

Figure 3:
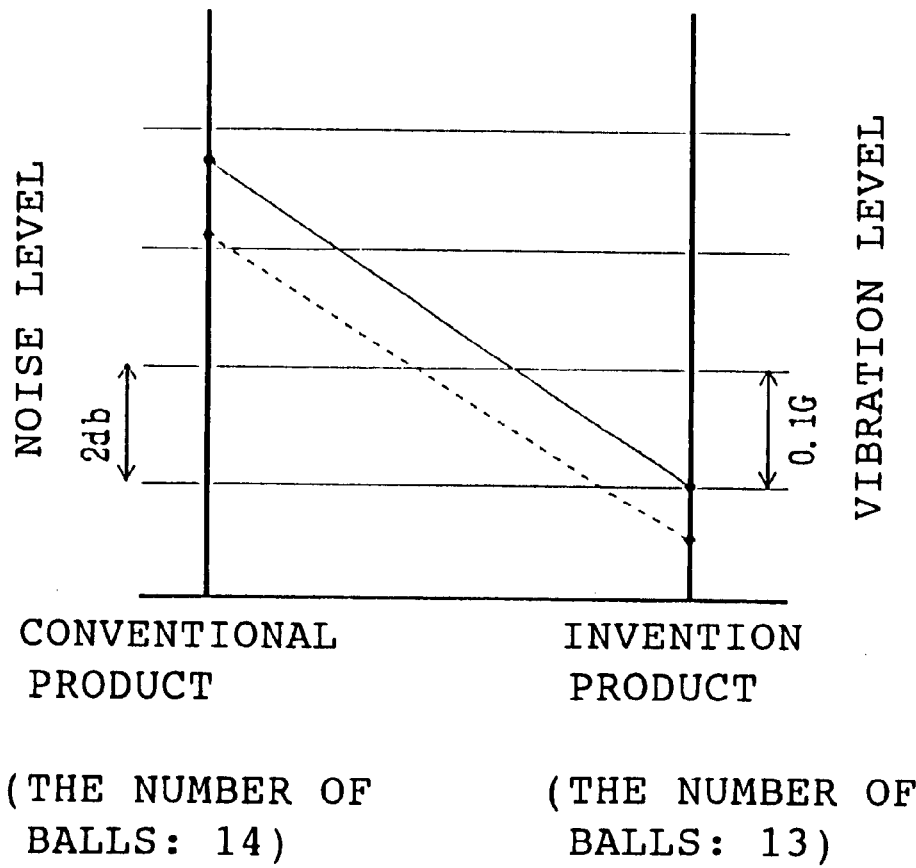
FIG. 3 is a explanatory view showing an empirical value of a relationship between the number of balls of the ball bearing and noise/vibration.

FIG. 3 shows a result of comparison between the vibration and noise on the gas compressor of the invention and the vibration and noise on a conventional gas compressor. In FIG. 3, the invention product is a gas compressor of the invention using the ball bearing 53 having an odd number of balls (thirteen) shown in FIG. 2 on the electromagnetic clutch 50 while the conventional product is a conventional gas compressor using a ball bearing 530 having an even number of balls (fourteen) shown in FIG. 10 on the electromagnetic clutch 50.

The data in FIG. 3 shows respective average values of vibration and noise measured under the same condition on each of five sets manufactured for the invention product and the conventional product.

As shown in FIG. 3, where assembling a ball bearing 53 having an odd number of balls of the invention, there is lower in noise level by a little over 5 dB and in vibration level by a little over 0.2 G as compared to the case of assembling a conventional ball bearing 530 having an even number of balls.

Next, the invention product and the conventional product were respectively mounted on actual vehicles, thereby conducting a noise measurement test and a vibration measurement test. The measuring conditions in the measurement test are as follows:

ambient temperature of 30° C.
vehicle halt state (idling state)
engine rotational speed Ne=1100 rpm (compressor rotation speed Nc=1400 rpm air conditioner in ON (compressor clutch ON) state.

Figure 10:
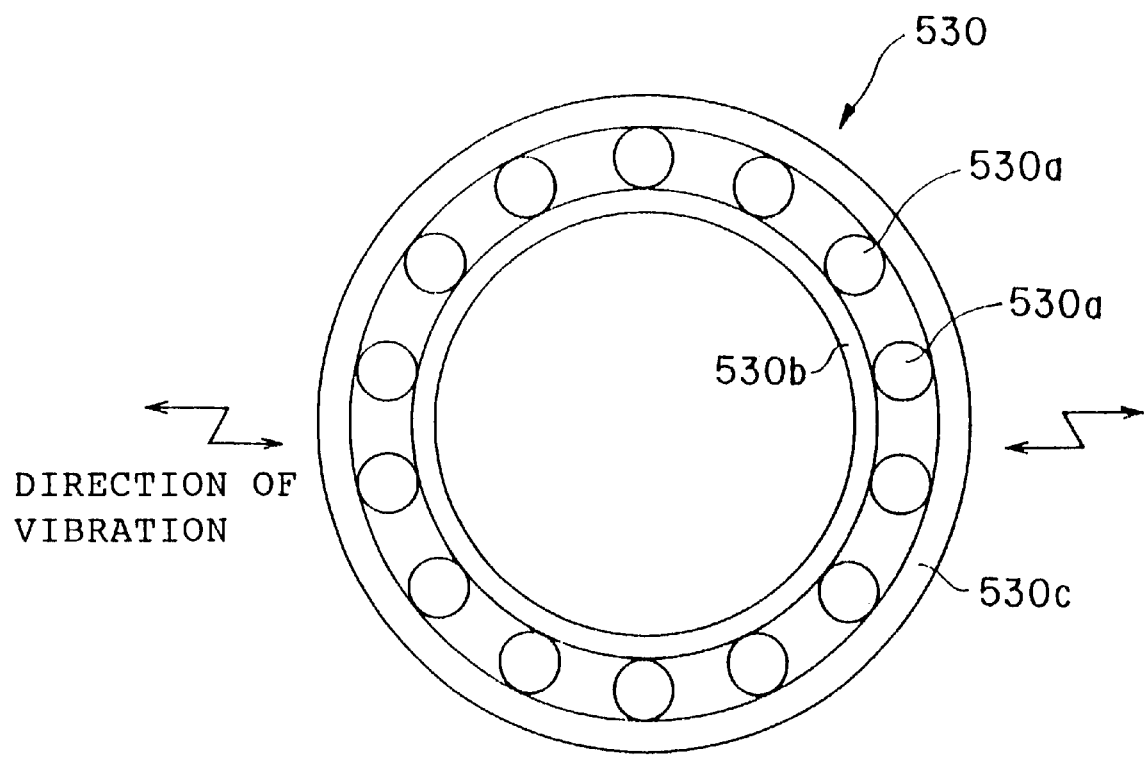
FIG. 10 is a front view of the related art ball bearing used in a gas compressor.

Incidentally, the invention product is a gas compressor of the invention using the ball bearing 53 having an odd number (thirteen) of balls shown in FIG. 2 on the electromagnetic clutch 50 while the conventional product is a conventional gas compressor using the ball bearing 530 having an even number (fourteen) of balls shown in FIG. 10 on the electromagnetic clutch 50.

Figure 4A:
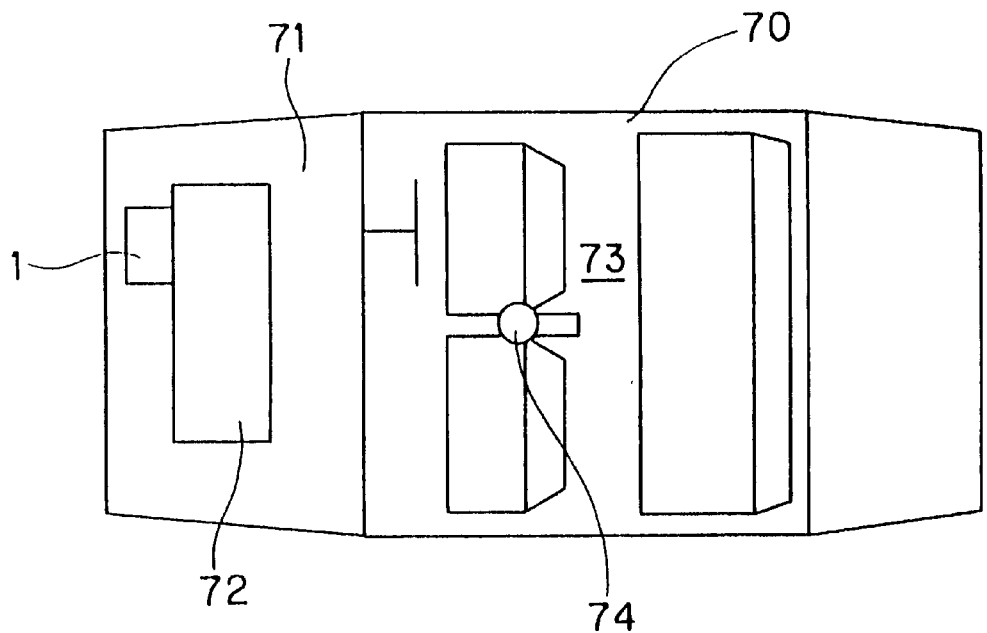
FIG. 4A is a plan view and FIG. 4B is side view showing a noise measuring position of a present-invention product and a conventional product in the actual vehicle.
Figure 4B:
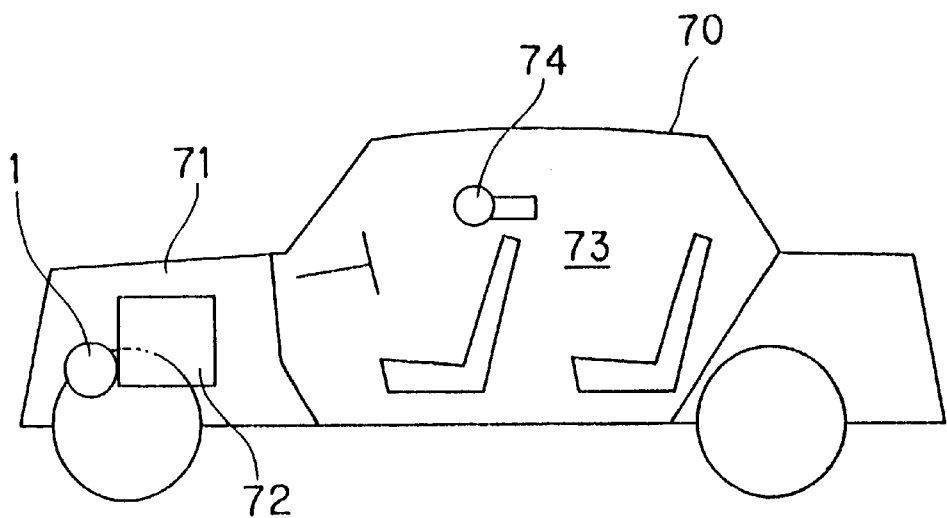

The noise measuring position is as shown in FIGS. 4A and 4B, wherein the gas compressor 1 is mounted on an engine 72 in an engine room 71 of the vehicle 70 and a microphone (noise meter) 74 for measuring noise is installed in a vehicular chamber 73.

This microphone 74 is set up in a center of the front seat, i.e. at an intermediate position between the driver's seat and the assistant driver's seat, at a height corresponding to the human ear.

Figure 5A:
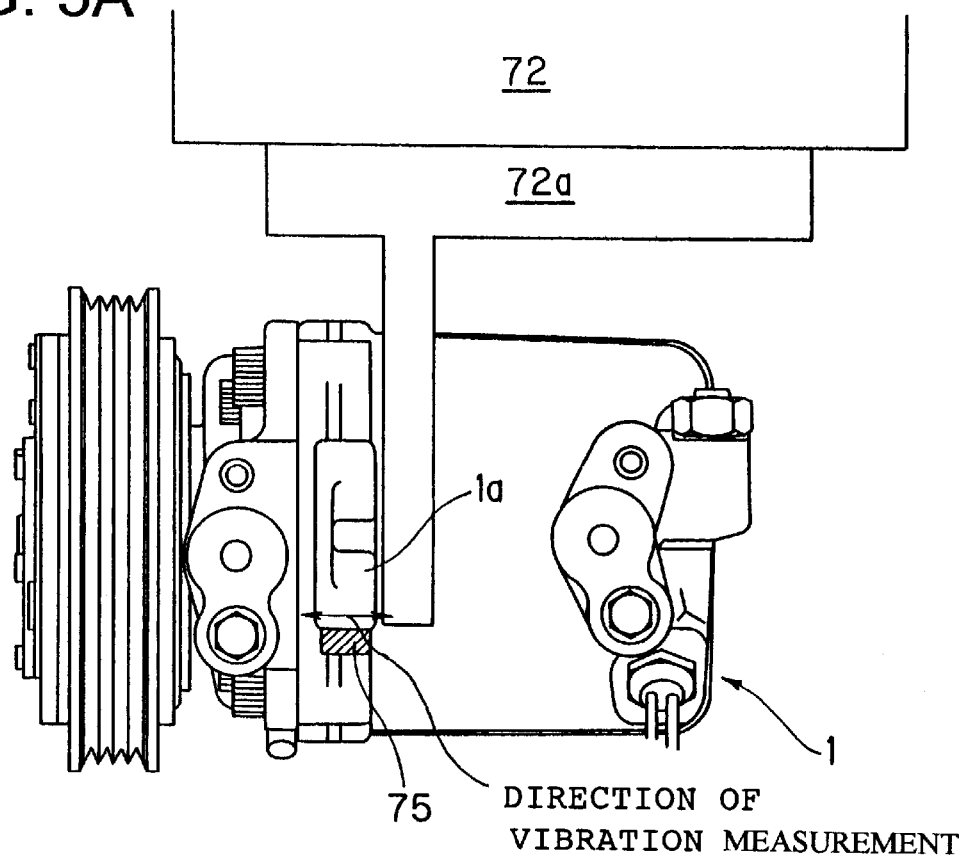
FIG. 5A is a plan view and FIG. 5B is a side view showing an installation point of vibrometers for a present-invention product and a conventional product in the actual vehicle.
Figure 5B:
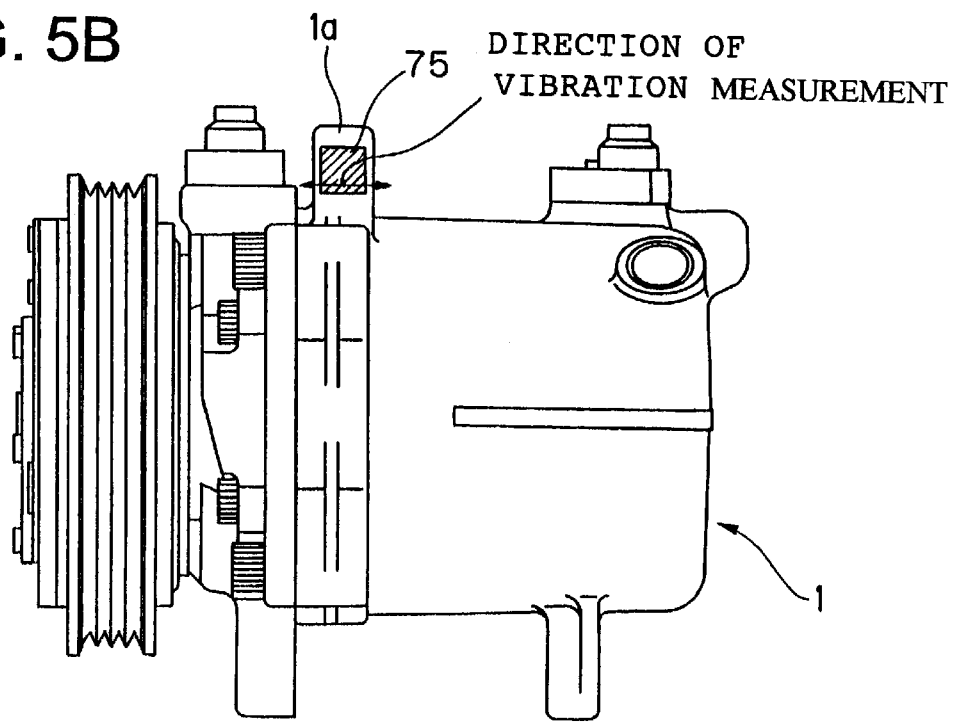

Next, the vibration measuring position is as shown in FIGS. 5A and 5B, wherein the gas compressor is mounted on the engine 72 through a compressor-mounting bracket 72a, and an acceleration pickup (vibrometer) 75 is mounted on a casing flange 1a of the gas compressor 1. The direction of vibration measurement is set in a front-and-rear direction of the gas compressor 1.

Then, frequency analysis (FFT analysis) is conducted. A result of noise measurement is shown as the invention product in graph of FIG. 6A and the conventional product in graph of FIG. 6B (frequency on the horizontal axis, noise level on the vertical axis).

Figure 7A:
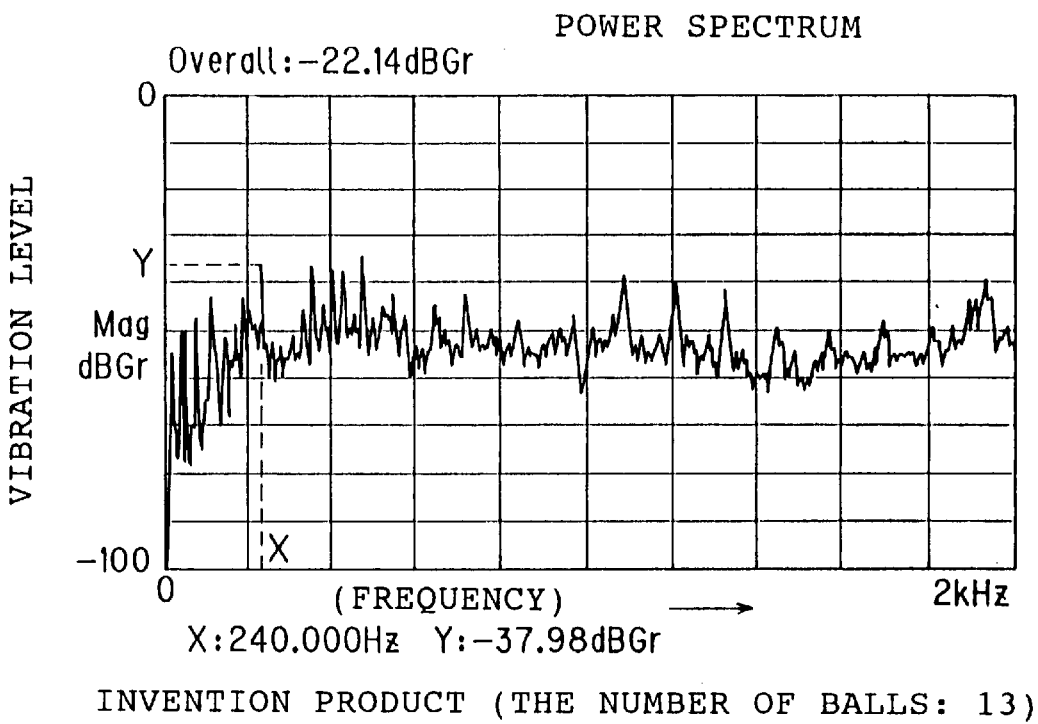
FIGS. 7A and 7B are graphs showing, by comparison, vibration levels of the present-invention product and the conventional product.
Figure 7B:
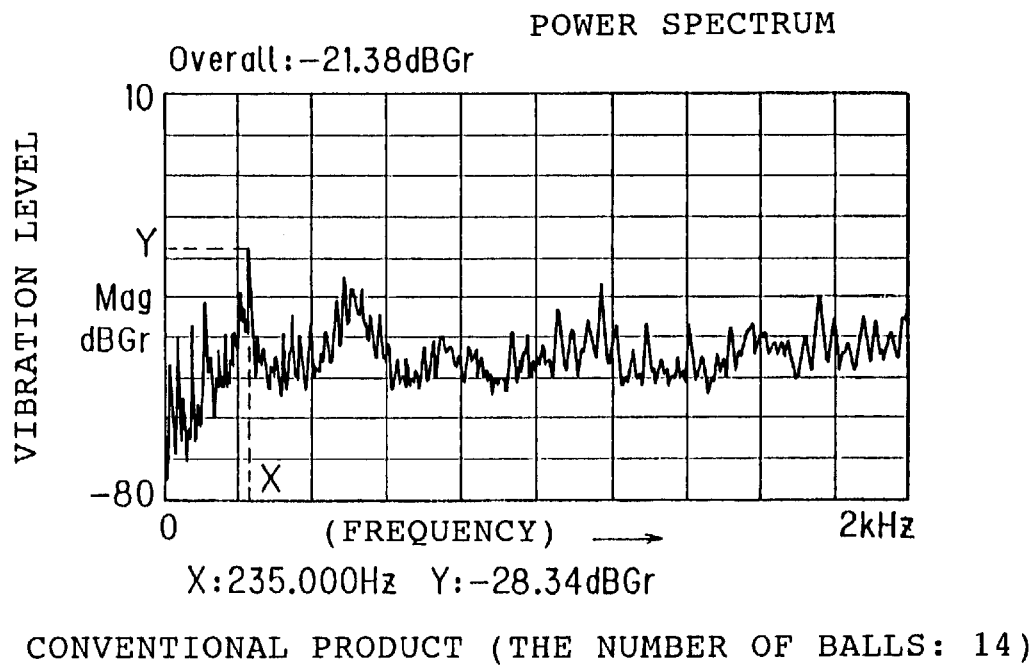

Meanwhile, a result of vibration measurement by a vibrometer 75 mounted on the gas compressor 1 is shown as the invention product in a graph of FIG. 7A and the conventional product in a graph of FIG. 7B (frequency on the horizontal axis, vibration level on the vertical axis).

Figure 6A:
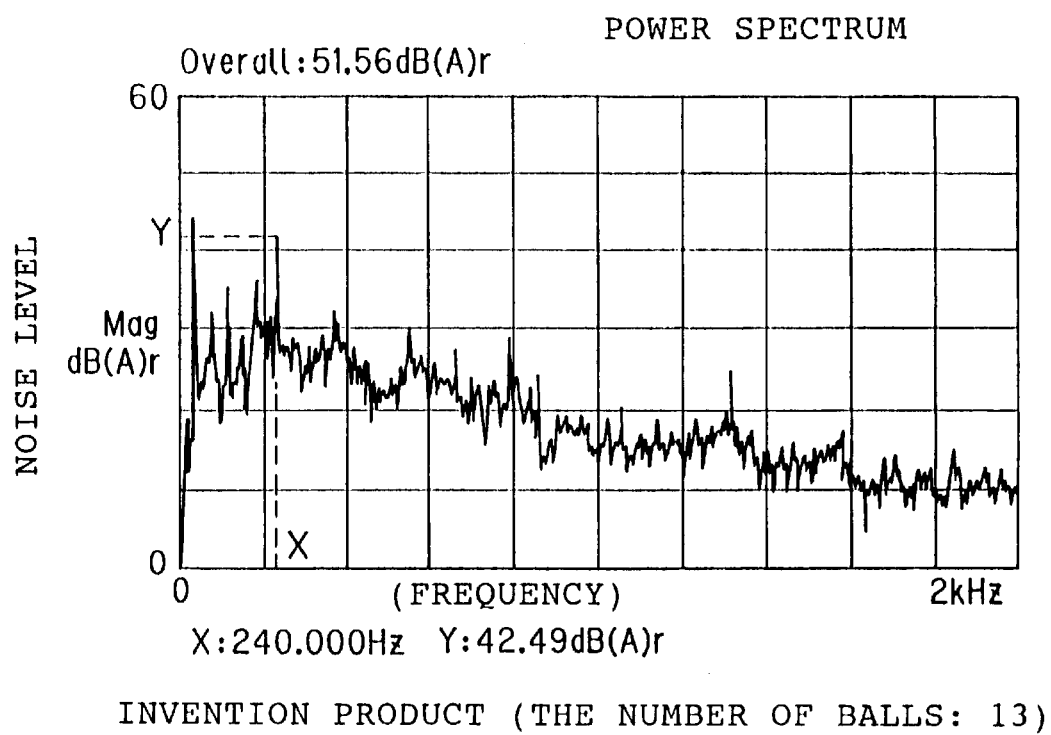
FIGS. 6A and 6B are graphs showing, by comparison, noise levels of the present-invention product and the conventional product.
Figure 6B:
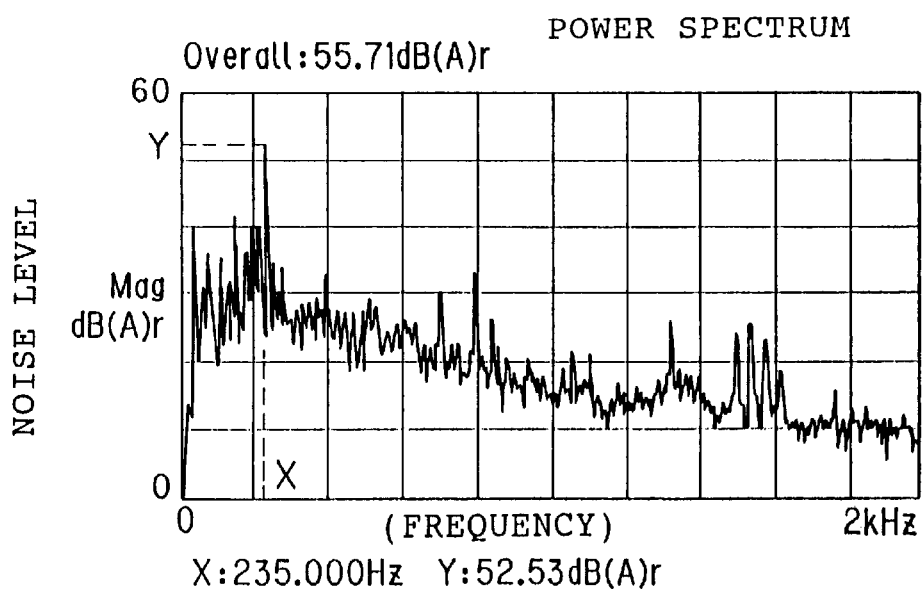

Accordingly, as apparent from comparison between the graphs of FIGS. 6A and 6B of concerning the noise measurement result of the present product and the conventional product, the noise level of the conventional product at a frequency 240 Hz conspicuous in noise is 52.53 dB whereas the noise level of the present invention product is 42.49 dB. It can be understood that the noise level decreases by about 10 dB.

Meanwhile, comparing the vibration measurement results shown in FIGS. 7A and 7B, the vibration level of the present invention product is −37.98 dB=0.13 G as compared to the vibration level of the conventional product of −28.34 dB=0.38 G. It can be understood that vibration is decreased by 0.2 G or greater. Incidentally, vibration is calculated as 0 dB=10 G by the use of the below calculation formula.

$$y[dB] = 20 \log\frac{\chi[G]}{10[G]} \Rightarrow \chi[G] = 10[G] \times 10^{\frac{y[dB]}{20}} = 10^{\frac{y[dB]}{20}+1} \quad \text{[Formula 1]}$$

Meanwhile, since the sound at about 240 Hz has been conspicuously heard in the vehicular compartment, the other frequencies of sound is guessed negligible.

In this manner, the following can be considered as the reason why the noise/vibration level can be reduced between the present invention and the conventional product.

In the ball bearing 53 of this invention, the odd number of balls 53a are not in a state in which they face each other but the deformation of the inner race 53b and outer race 53c of the ball bearing 53 is irregular and complicated in form. The deformation/vibration at a regular particular frequency is eliminated to decrease the vibration/noise level. On the contrary, in the conventional ball bearing 530, the even number of balls 530a face each other and are arranged in a linear symmetry. The deformation/vibration at a regular particular frequency is caused in the inner race 530b, and the outer race 530c so that the vibration/noise level is high.

The above explained embodiment explained the gas compressor 1 of a rotary vane type provided with the electromagnetic clutch 50 having an odd number of balls in the ball bearing 53. However, an electromagnetic clutch 50 of the same structure may be mounted on a scroll type gas compressor 80 shown in FIG. 8. Meanwhile, as shown in FIG. 9, the electromagnetic clutch 50 may be mounted on a slant-plate type gas compressor 90.

Figure 8:
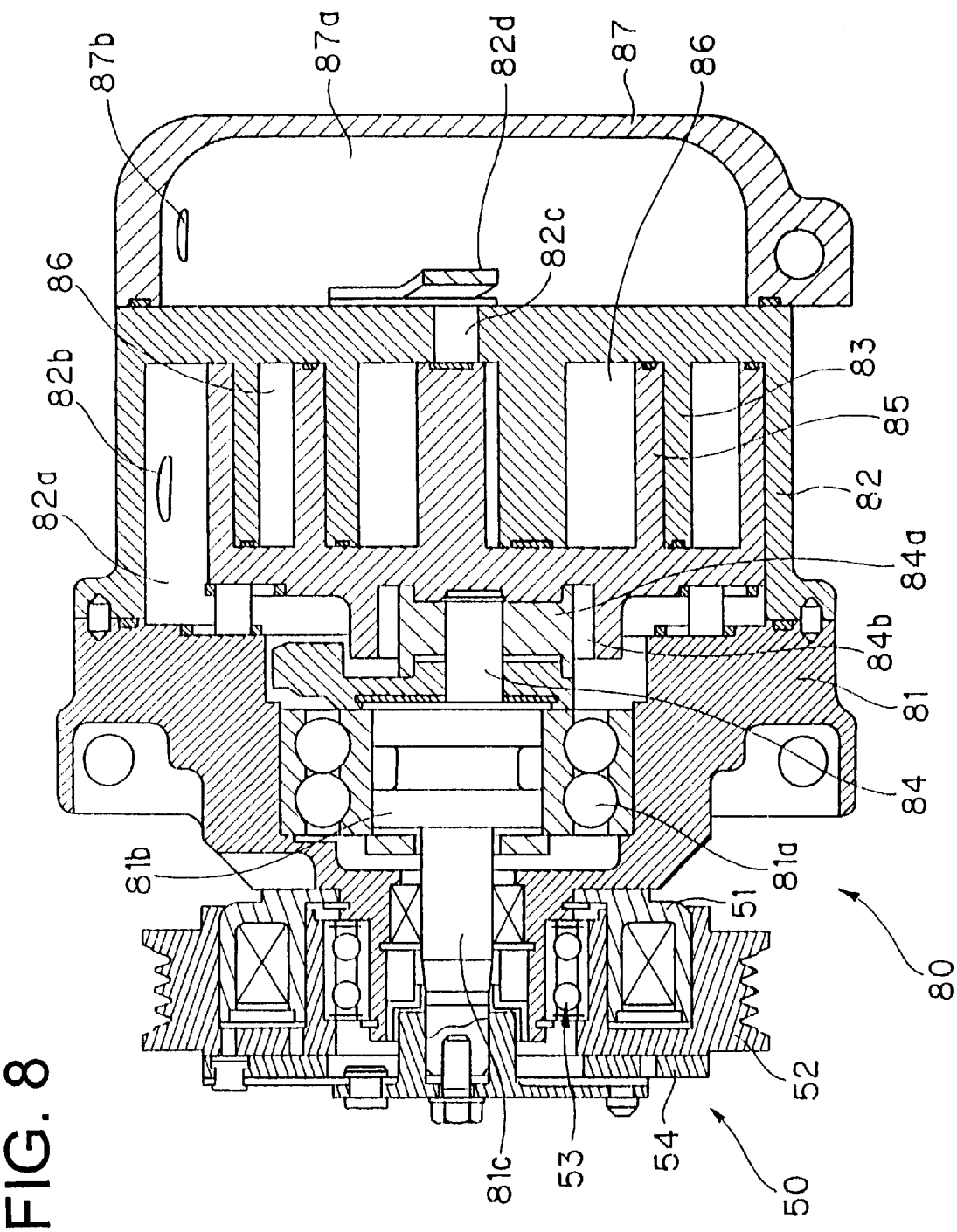
FIG. 8 is an explanatory view showing a schematic structure of a scroll type gas compressor mounted with an electromagnetic clutch according to the invention.
Figure 9:
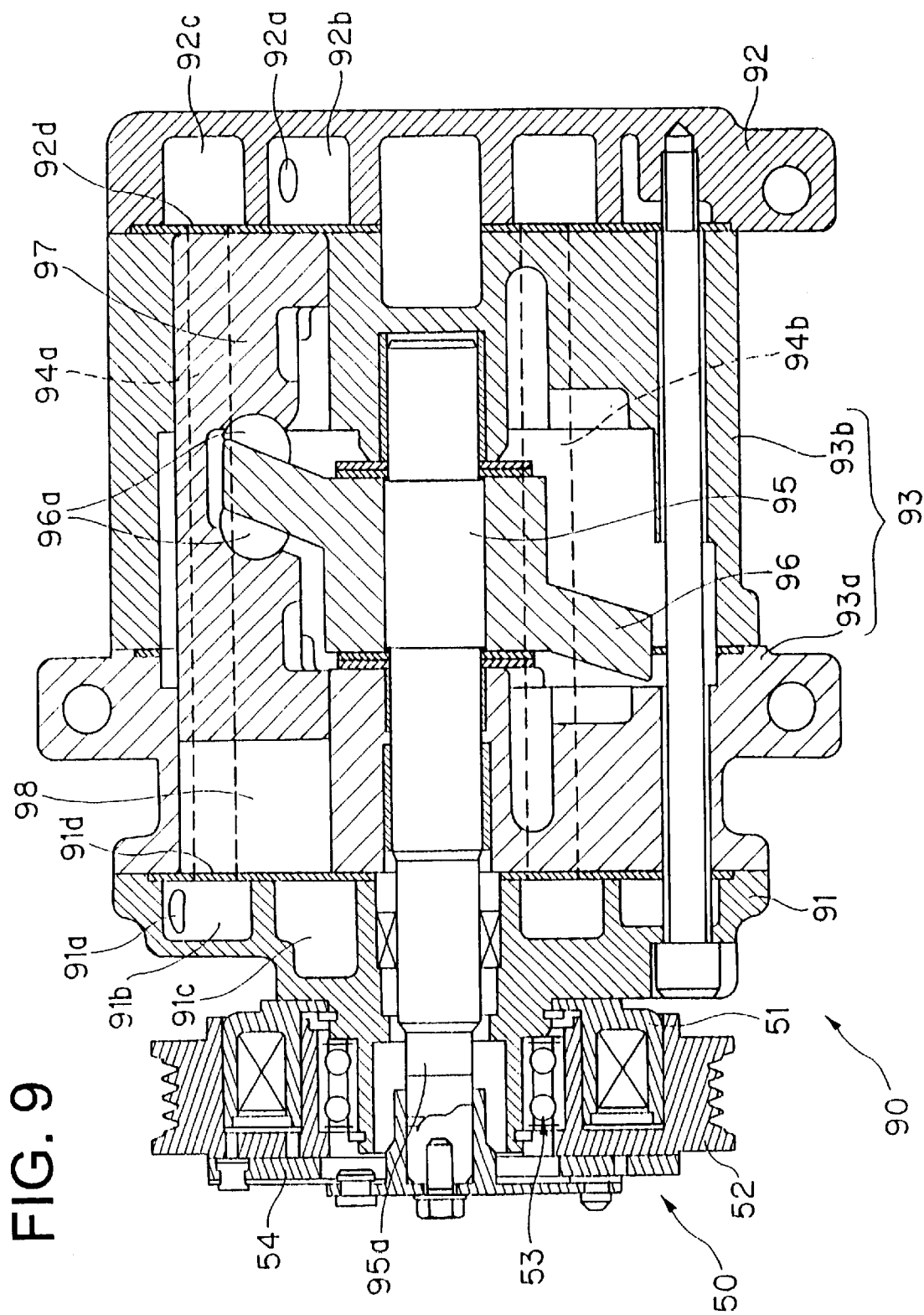
FIG. 9 is an explanatory view showing a schematic structure of a slant plate type gas compressor mounted with the electromagnetic clutch according to the invention.

The schematic structure and compression operation of the scroll type gas compressor 80 is explained on the basis of FIG. 8. The scroll type gas compressor in the present embodiment has a scroll type compression chamber arranged in a center. At an electromagnetic clutch side of the compression chamber, a drive section for swiveling a swivel scroll is arranged and a discharge chamber is arranged on an opposite side of the electromagnetic clutch.

That is, as shown in FIG. 8, in the scroll type gas compressor 80 the front housing 81 in an inner periphery rotatably supports a rotor 81b through a bearing 81a. The side wall on the opposite side to the electromagnetic clutch 50 side of the front housing 81, at an outer periphery, is in close contact with one end surface of a fixed scroll housing 82, forming a front-side side wall of the suction chamber 82a. Incidentally, the rotor shaft 81c provided integral with the rotor 81b is integrated with a follower armature plate 54 of the electromagnetic clutch 50.

The fixed scroll housing 82 has a cylindrical outer wall. On the outer wall, the suction port 82b is provided. Furthermore, the fixed scroll housing 82 is provided with disc-formed side wall integral with the outer wall and perpendicular to a rotor rotation axis. In this side wall, a fixed scroll 83 in a spiral form is formed. The outermost periphery of the fixed scroll 83 constitutes the suction chamber 82a.

Furthermore, in the front housing 81, the rotatably supported rotor 81b is integrally provided with an eccentric shaft 84 in a position deviated from the rotation axis of the rotor 81b in an end on the side opposite to the electromagnetic clutch side. On the eccentric shaft 84, an eccentric ring 84a is fixed to rotatably support the swivel scroll 85 through a needle bearing 84b.

The swivel scroll 85 rotatably supported on the eccentric shaft 84 has a disc-formed side wall and a scroll wall in a spiral form integrally formed rectangular to the side wall. A plurality of crescent-formed compression chambers 86 are formed by the above-mentioned fixed scroll 83 and the swivel scroll 85.

Furthermore, the fixed scroll housing 82 is provided with a discharge port 82c to discharge a compressed refrigerant gas and further a discharge valve 82d to prevent reverse flow of the refrigerant gas.

Further, a rear housing 87 is provided on a back side of the fixed scroll 83. The rear housing 87, together with a side wall of the fixed scroll housing 82, constitutes a discharge chamber 87a. The rear housing 87 at its outer periphery is provided with a discharge port 87b for connection to an external system.

Next, explaining the compressing operation of the scroll type gas compressor 80 mounted with the electromagnetic clutch 50 according to the invention is explained. When the electromagnetic clutch 50 is being excited, the follower amateur plate 54 on the follower side connected to the rotor shaft 81c is adsorbed to and integrated with the end surface 52a of the prime-mover pulley 52. A rotation force is transmitted from the engine or the like through a belt, to rotate the rotor 81b and eccentric shaft 84 through the electromagnetic clutch 50.

Due to rotation of the eccentric shaft 84, the swivel scroll 85 makes swivel motion.

If the swivel scroll 85 starts swivel motion, the suction chamber 82a and the compression chamber 86 are repeated of communication and non-communication by the relative movement to the fixed scroll 83. During communication, the refrigerant gas under low pressure taken through the suction port 82b and temporarily reserved in the suction chamber 82a is sucked to the compression chamber 86 in the outermost periphery.

If the swivel of the swivel scroll 85 proceeds, the suction chamber 82a and the compression chamber 86 are shielded of communication, to confine the low-pressure refrigerant gas within the crescent-formed compression chamber 86. The crescent-formed compression chamber 86 when the swivel of the swivel scroll 85 proceeds is reduced in its volume while changing an angle toward a circumferential direction, moving toward an inner peripheral portion. Simultaneously therewith, the next communication between the suction chamber 82a and the compression chamber at the outermost periphery is started thereby continuously carrying out suction and compression of refrigerant gas.

When the swivel of the swivel scroll 85 further proceeds, the crescent-formed compression chamber 86 reaches a center of the rotation axis center, and refrigerant gas is push up the discharge valve 82d through the discharge port 82c, discharging to the discharge chamber 87a. The high-pressure refrigerant gas discharged to the discharge chamber 87a is passed through the discharge port 87b and discharged to the not-shown system high-pressure piping.

In this manner, even if the electromagnetic clutch 50 according to the invention is applied to the scroll type gas compressor 80, there is the same operation/working effect of lowering the vibration/noise level similarly to the rotary-vane type gas compressor.

Next, FIG. 9 shows a schematic structure of a slant plate type gas compressor 90 mounted with the electromagnetic clutch 50 according to the invention. The slant plate type gas compressor 90 in this embodiment is a both slant plate type gas compressor having compression chambers existing in the front and rear of a sandwiched center slant plate to suck, compress and discharge a refrigerant gas by reciprocal motion of a one-bodied piston.

The number of compression chambers or pistons is given an arbitrary number depending on a discharge volume required for the compressor. In this example, the pistons are five in the number and there are ten compression chambers in totally in the front and rear.

In FIG. 9, the slant plate type gas compressor 90 is first formed, in an outer periphery of the front housing 91, with a section port 91a for connection to a suction-side piping. An annular front suction chamber 91b is formed communicating with the suction port 91a. Meanwhile, an annular front discharge chamber 91c is formed on an inner peripheral side of the suction port 91a. In a end surface on the compression chamber side of the front housing 91, a disc-formed front valve plate 91d is fixed closely.

Similarly, the structure of the rear housing 92 has a discharge port 92a for connection to a system discharge-side piping and formed such that communicating to the discharge port 92a, the annular rear discharge chamber 92b surrounds an outer periphery of the pin. Furthermore, on an outer peripheral side of the rear discharge chamber 92b, a rear suction chamber 92c is formed that is in a horse's-hoof form disconnected only in a communication part of the discharge port 92a and the rear discharge chamber 92b. Also, the rear housing 92 at its end surface on the compression chamber side is closely fixed with a disc-formed rear-valve plate 92d.

A cylinder block 93 interposed between the front housing 91 and the rear housing 92 has a front cylinder block 93a and a rear cylinder block 93b that are pin-coupled through a gasket 93c. The cylinder block 93 is provided with a suction passage 94a communicating between the front suction chamber 91b and the rear suction chamber 92c and a discharge passage 94b communicating between the front discharge chamber 91c and the rear discharge chamber 92b.

Furthermore, in the cylinder block 93 is rotatably supported a rotor shaft 95. The rotor axis 95a at a tip of the rotor shaft 95 is integrated with the follower armature plate 54 of the electromagnetic clutch 50 and is rotatively driven by receiving a drive force on the electromagnetic clutch 50 side.

The rotor shaft 95 is fixed with a slant plate 96 by a not-shown key or the like. This slant plate 96 at its outer periphery is formed in a size reaching a center of a plurality of pistons 97 radially arranged. The slant plate 96 at its forward and rearward surfaces is slidably holds a semi-spherical shoe 96a. Through the shoe 96a, the rotation motion of the slant plate 96 is converted into an axial reciprocal motion of the piston 97.

Incidentally, FIG. 9 shows a state in which the piston 97 is retracted to the rear housing 92 side, in this state the front compression chamber 98 exhibits a maximum volume.

Next, explanation is made on the compression operation of a refrigerant gas by the slant plate type gas compressor 90. The rotation force from the engine or the like is transmitted by the belt or the like, to rotate the rotor axis 95a, rotor shaft 95 and slant plate 96 through the electromagnetic clutch 50.

By the rotating slant plate 96, the piston 97 reciprocates in a rotation-axis direction through the shoe 96a. The piston 97 shown starts to move toward the front chamber 98 simultaneously with rotation of the slant plate 96.

At this time, the refrigerant gas under low pressure sucked from the suction port 91a flows into the front suction chamber 91b and enters a rear suction chamber 92c through the suction passage 94a. The valve, not shown, of the rear valve plate 92d opens toward the piston to suck into a rear compression chamber, also not shown.

On the other hand, on a front compression chamber 98 side of the same piston 97, the low-pressure refrigerant gas stayed in the front compression chamber 98 is compressed by the piston 97. The compressed refrigerant gas reaches a predetermined high pressure whereupon the valve formed on the front valve plate 91d opens to discharge it to the front discharge chamber 91c. The high-pressure refrigerant gas discharged into the front discharge chamber 91c passes the discharge passage 94c to enter the rear discharge chamber 92b, and is discharged toward the system through the discharge port 92a. Incidentally, the embodiment of the both slant plate type gas compressor was explained above, application is possible for a single-side slant plate gas compressor forming a compression chamber on one of the front side and the rear side.

This slant plate gas compressor 90 has the similar effect of reducing the level of noise/vibration because an odd number of ball bearings incorporated in the electromagnetic clutch 50.

It is understood that the ball bearings used in the invention have the similar operation/working-effect if a single-row ball bearing is used but is limited to a ball bearing having a plurality of rows of balls.

As explained in detail above, in this invention, because the number of balls per row of the ball bearing for the electromagnetic clutch is an odd number, the level of vibration and noise of the ball bearing during rotation is lowered.

What is claimed is:

1. An electromagnetic clutch comprising:
   an electromagnet;
   a rotational member mounted to undergo rotation;
   an armature selectively coupled to the rotational member for rotation therewith when the electromagnet is energized; and
   a ball bearing for rotatably supporting the rotational member, the ball bearing having an inner race, an outer race, and a plurality of balls arranged in a plurality of rows each containing an odd number of the balls, the balls being disposed between the inner race and the outer race so that each of the balls contacts the inner race at at least one point and contacts the outer race at at least one point.

2. A gas compressor comprising: an electromagnetic clutch according to claim 1; and a rotor having a rotor shaft connected to the armature for rotation therewith when the armature is coupled to the rotational member.

3. A gas compressor according to claim 2; wherein the gas compressor is a rotary vane-type gas compressor.

4. A gas compressor according to claim 2; wherein the gas compressor is a scroll-type gas compressor.

5. A gas compressor according to claim 2; wherein the gas compressor is a slant plate-type gas compressor.

6. A gas compressor according to claim 2; further comprising a casing having a chamber containing a gas; and wherein the rotor is disposed in the casing for compressing the gas in the chamber during rotation of the rotor.

7. An electromagnetic clutch according to claim 1; wherein the electromagnet is generally ring-shaped.

8. An electromagnetic clutch according to claim 1; wherein the plurality of rows of balls of the ball bearing comprises two rows.

9. An electromagnetic clutch according to claim 8; wherein each of the rows of balls contains thirteen balls.

10. An electromagnetic clutch according to claim 1; wherein each of the rows of balls of the ball bearing contains thirteen balls.

11. A ball bearing assembly comprising: an inner race; an outer race; and a plurality of balls arranged in a plurality of rows each containing an odd number of the balls, the balls being disposed between the inner race and the outer race so that each of the balls contacts the inner race at at least one point and contacts the outer race at at least one point.

12. A ball bearing assembly according to claim 11; wherein the plurality of rows of balls comprises two rows.

13. A ball bearing assembly according to claim 12; wherein each of the rows of balls contains thirteen balls.

14. A ball bearing assembly according to claim 11; wherein each of the rows of balls contains thirteen balls.

15. An electromagnetic clutch comprising: a rotor mounted to undergo rotation; a stator mounted to undergo rotation and having an electromagnet; a rotational member connected to the stator for rotation therewith; an armature selectively coupled to the rotational member for rotation therewith when the electromagnet is energized; and a ball bearing for rotatably supporting the rotational member, the ball bearing having an inner race connected to the stator, an outer race connected to the rotor for receiving a radial load during rotation of the rotor, and a plurality of balls arranged in a plurality of rows each containing an odd number of the balls, the balls being disposed between the inner race and the outer race so that each of the balls contacts the inner race at at least one point and contacts the outer race at at least one point.

16. An electromagnetic clutch according to claim 15; wherein the plurality of rows of balls of the ball bearing comprises two rows.

17. An electromagnetic clutch according to claim 16; wherein each of the rows of balls of the ball bearing contains thirteen balls.

18. An electromagnetic clutch according to claim 15; wherein each of the rows of balls of the ball bearing contains thirteen balls.

* * * * *